United States Patent [19]

Tuzzio et al.

[11] Patent Number: 5,676,992
[45] Date of Patent: Oct. 14, 1997

[54] PROCESS FOR PREVENTING ACCUMULATION OF MATERIAL ON A CUTTING MECHANISM

[75] Inventors: Paul V. Tuzzio, North Canton, Ohio; Rick Ruegg, Coppell, Tex.

[73] Assignee: Recot, Inc., Pleasonton, Calif.

[21] Appl. No.: 572,237

[22] Filed: Dec. 13, 1995

[51] Int. Cl.$^6$ .................................................. A21D 6/00
[52] U.S. Cl. ...................... 426/516; 426/503; 426/518
[58] Field of Search ........................... 426/516, 518, 426/496, 503; 425/377; 83/14, 15, 16

[56] References Cited

U.S. PATENT DOCUMENTS

| | | | |
|---|---|---|---|
| 3,161,157 | 12/1964 | Fries | 425/311 |
| 3,314,381 | 4/1967 | Fries et al. | 425/311 |
| 4,340,343 | 7/1982 | Mancini | 425/311 |
| 4,422,372 | 12/1983 | Hoezee | 426/516 |
| 5,074,775 | 12/1991 | Jeanneret | 425/217 |
| 5,427,809 | 6/1995 | Donnely et al. | 426/516 |

*Primary Examiner*—George Yeung
*Attorney, Agent, or Firm*—Rothwell, Figg, Ernst & Kurz

[57] ABSTRACT

Material, for example food material, is extruded through an extrusion die and cut into individual portions by a cutter blade which reciprocates across the die. A hot air blower device directs hot air against the cutter blade to prevent the food material, e.g., pretzel dough, from adhering to or accumulating on the cutter blade, thereby reducing machine down time caused by the need to periodically stop and clean the cutter blade. The hot air blower device receives cool air which is passed through the hot air tools and expelled as hot air by a fan-shaped nozzle disposed opposite the cutter blade.

13 Claims, 3 Drawing Sheets

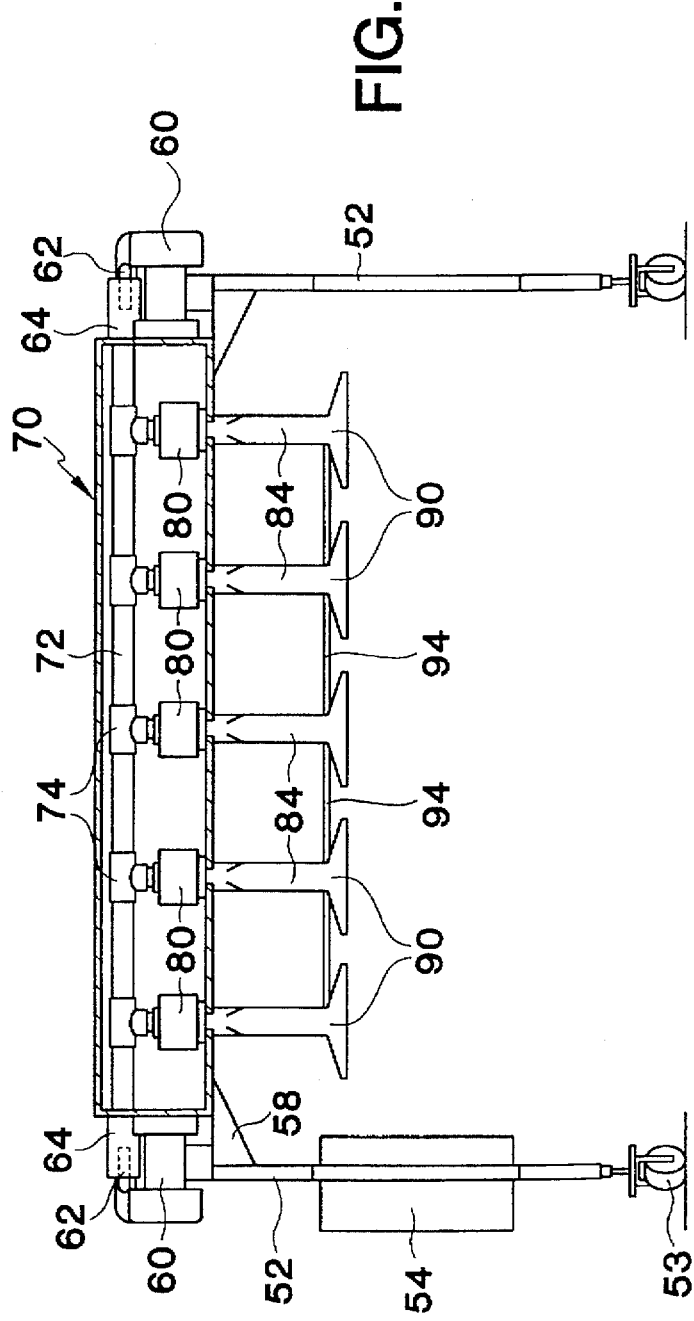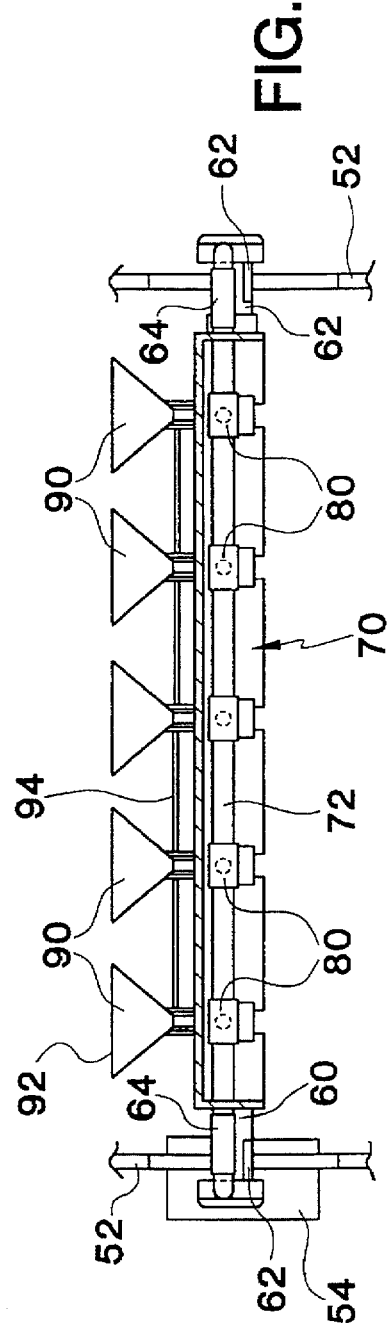

PROCESS FOR PREVENTING ACCUMULATION OF MATERIAL ON A CUTTING MECHANISM

BACKGROUND OF THE INVENTION

1. Field of the Invention

The present invention generally relates to extruding material and cutting the extruded material into portions while preventing material build up on the cutter. More particularly, the present invention relates to extruding material for producing snack food product, for example pretzel dough, and cutting the extruded material into a plurality of product portions while preventing the build up of material on the cutter.

2. Description of Related Art

The use of extrusion apparatus to produce snack food products formed from dough is known in the art. Such apparatus typically include an inlet and an outlet, the outlet comprising an opening with a die plate or the like secured thereto which has a die opening for extruding the material into a desired configuration. The dough or other material is fed into the inlet and extruded by known means so as to exit the outlet of the apparatus through the opening in the die plate, thus producing an extrudate which then may be suitably cut and formed depending on the particular product being produced.

There exist several problems with prior art apparatus which extrude material and cut the extruded material, for example, apparatus used in the production of snack food product. A common problem which arises during extrusion of some materials, for example dough, is that the dough tends to adhere and build up on the cutter blade. In practice, the dough builds up fairly rapidly on the surfaces of the cutter blade. This necessitates frequent periodic cleaning of the blade to remove the dough build up, which in turn results in a significant amount of machine downtime.

The prior art has attempted to address the problem of dough adhering to a cutting surface in various ways. For example, U.S. Pat. No. 4,422,372 discloses a food extruder comprising an extruder plate and a knife assembly that cuts the extruded food material. The extruder plate and the knife are enclosed in a watertight housing which is filled with a heated fluid that forms a slurry with the extruded food product and serves to keep the product from adhering to each other or the knife assembly. U.S. Pat. No. 4,430,343 discloses a food preparation machine which includes a dough extruder disposed above a flouring ramp, and a knife assembly with a rotating blade positioned below the extruder that cuts the extruded dough into short plugs. The extruder drops the dough plugs onto the flouring ramp, which has holes therein, and air is directed through the holes in the ramp to blow flour onto the blade to counteract adhesion of the dough to the blade.

U.S. Pat. No. 5,074,775 discloses a cleaning apparatus including a movable spatula for cleaning the bottom of a filled chocolate mold. The spatula is covered with chocolate after each run, and hot air is forced against the spatula to melt and remove the chocolate. This patent teaches melting and removing the chocolate from the spatula after each run over the mold, as opposed to preventing the accumulation of chocolate on the spatula. U.S. Pat. Nos. 3,161,157 and 3,314,381 disclose apparatus for producing food products which include an extrusion nozzle and a knife for cutting the product. Compressed air is directed at the nozzle to forcibly separate the severed extrudate from the nozzle. Thus, this apparatus knocks the extruded dough from the nozzle and does not prevent dough from adhering to the knife.

Accordingly, there is a need in the art for an improved process and apparatus for preventing the build up of various materials on a cutter mechanism which avoids the problems present in prior art systems.

SUMMARY OF THE INVENTION

The present invention provides an apparatus and process for preventing or reducing the build up of material on a cutter mechanism. In particular, we have found that in extruding pretzel dough, and particularly dough used to produce fat free pretzels, a considerable amount of machine downtime is caused by having to stop the machine and physically clean the cutter blade. The cutter blade is reciprocated across a die plate to continuously cut the extruded dough into individual portions and repeatedly becomes fouled during production due to dough accumulating on the surface(s) of the blade. Obviously, the more rapidly dough builds up on the cutter blade, the more frequent cleaning of the blade and thus stoppage of the production line will be required. The apparatus of the present invention includes at least one air blower unit which feeds pressurized air to a hot air tool/heater device, and a nozzle which directs the hot air against the cutter blade and/or extruder die plate. The invention permits substantially continuous production of dough products for extended periods of time without significant accumulation of dough on the cutter blade.

BRIEF DESCRIPTION OF THE DRAWINGS

FIG. 4 is a rear elevation view of the apparatus shown in FIG. 3; and

FIG. 5 is a plan view of the apparatus shown in FIG. 3 with portions cut away for clarity.

DETAILED DESCRIPTION OF THE DRAWINGS

Figure 1:
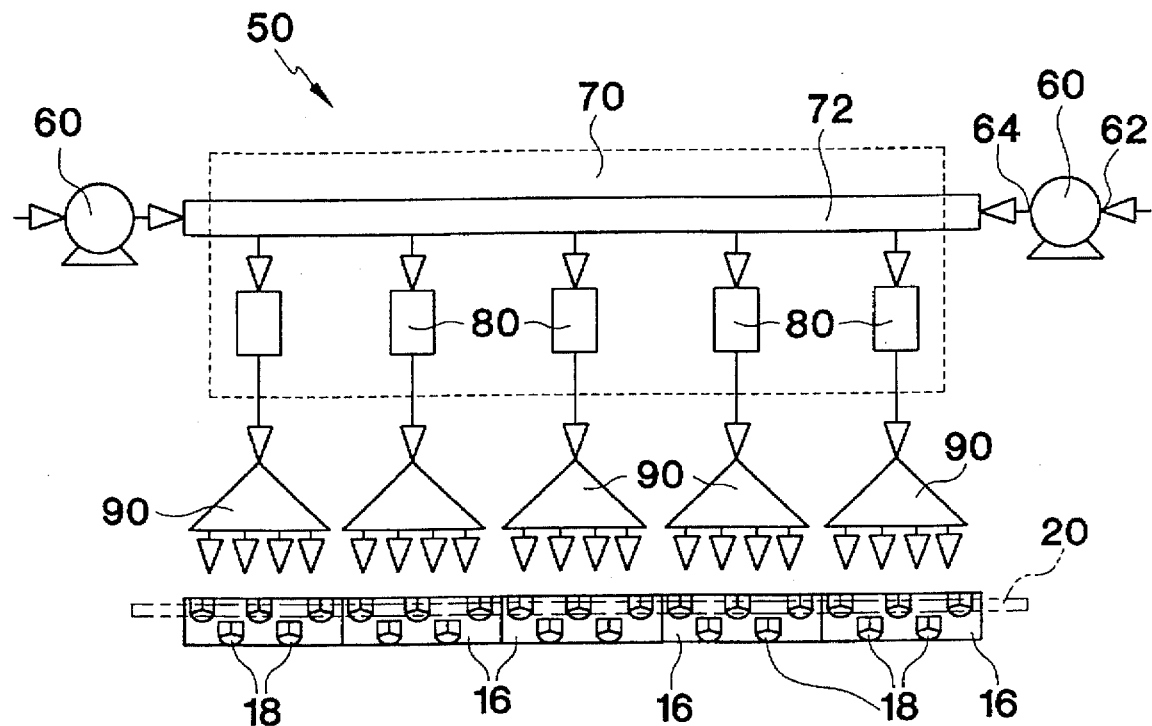
FIG. 1 is a front elevation view showing in schematic fashion an extrusion die, a cutter mechanism, and an apparatus for preventing accumulation of material on the cutter apparatus according to a preferred embodiment of the present invention.

With reference to FIG. 1, an apparatus for preventing the accumulation of material on a cutter blade is indicated generally by the reference numeral 50. Although the preferred embodiment of the invention is described in connection with producing extruded snack food product, such as pretzels, persons skilled in the art will recognize that such description is for exemplary sake only as the invention may be used to prevent cutter blade fouling during production and cutting of various materials.

FIG. 1 is a schematic representation of an apparatus for extruding and cutting material in combination with an apparatus 50 for preventing accumulation of material on the cutter blade according to a first preferred embodiment of the invention. A plurality of extrusion dies or die plates 16 are shown with a cutter bar 20 disposed adjacent to the front surfaces or faces of the dies 16. Each die plate 16 includes a plurality of die openings 18 through which the material is extruded. In FIG. 1, the die openings 18 are pretzel-shaped and the die plates 16 extrude pretzel dough, the extruded pretzel-shaped length of dough being cut into individual pretzels by the cutter bar 20. As discussed above, one problem with prior art extruding and cutting apparatus is that the material, for example snack food product, adheres to or accumulates on the cutter bar which is wiped across the die face. It is necessary with prior art apparatus to periodically stop the machine and clean the accumulated material from the cutter.

While the embodiment in FIG. 1 includes five separate die plates 16 with five die openings 18 in each die plate, it will be recognized that any number of die plates and die openings may be used. Also, the die plates may be in the form of separate members attached to each other or a continuous die plate with openings. Similarly, a continuous cutter bar 20 which simultaneously cuts the extruded dough from each die plate 16 preferably is used; however, more than one cutter bar could be utilized as well.

Figure 2:
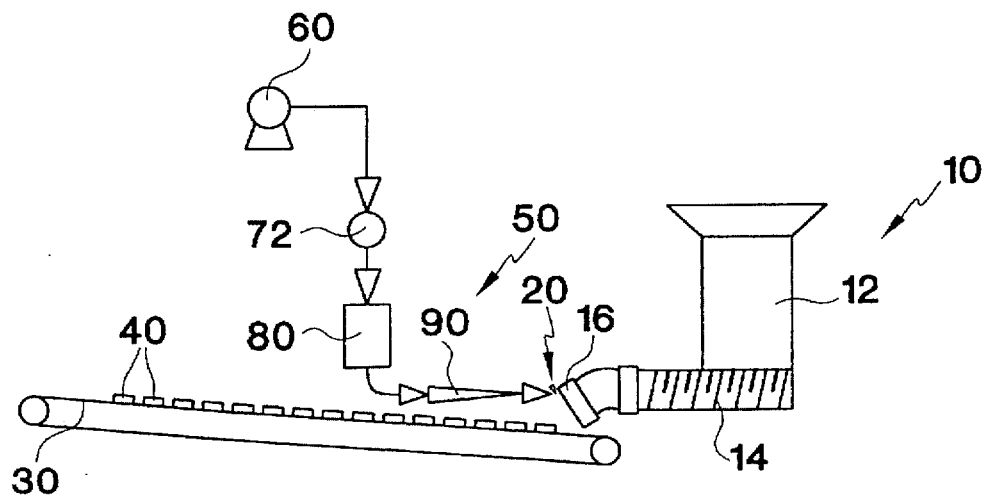
FIG. 2 is a side elevation view showing in schematic fashion an extruder, an extrusion die, a cutter mechanism, and the apparatus according to the present invention.

The preferred embodiment of an apparatus 50 for preventing material accumulation on the cutter blade includes a pair of air blower units 60 each of which includes an air inlet 62 and an air outlet 64. The air is drawn into the inlet 62 where it is pressurized by the blower and exhausted at 64 to the inlet of an air distribution manifold tube 72 located in a manifold housing 70 (shown in phantom in FIG. 1). Preferably, the blower units 60 draw in cool, ambient or room air which air is pressurized and fed to the air distribution manifold tube 72. The air distribution manifold tube 72 receives the pressurized air from outlet 64 of blower unit 60 and distributes the pressurized air to a plurality of hot air tools designated by reference numeral 80. As seen in FIGS. 1 and 2, in which the air flow is indicated by arrows, the pressurized air exits air distribution manifold tube 72 and enters the upper portion of each hot air tool 80. The hot air tools 80 have a construction which is known per se, and preferably include a resistance heater over which the pressurized air passes to be heated to the desired temperature. The hot air tools 80 feed hot air into distribution nozzles 90, the structure of which is described below, which in turn direct the hot air at the cutter blade 16 to prevent material build up as is discussed further below.

The air blower unit 60 may be any suitable commercial high pressure blower, for example, a Leister-Robust Pressure Blower, Model 9F. The hot air tool 80 which receives and heats air may also have a known construction, for example, a 3300 Leister heater/hot air tool.

FIG. 2 shows an extruder 10 which includes a hopper 12 and a suitable extruding device such as screw 14. The die plate 16 is secured to the outlet of the extruder 10 and a cutter 20 is disposed adjacent the face of the die 16. The cutter 20 is reciprocated across the die face to cut the extruded material into suitable portions as is known in the art. The product portions 40 drop onto a conveyor belt 30 where they are carried to an area (not shown) for further processing. The apparatus 50 of the present invention is shown schematically in FIG. 2. As seen by the arrows, the air blower unit 60 feeds air to the hot air tool 80 which in turn heats and feeds the air into the distribution nozzle 90. Preferably the distribution nozzle 90 is oriented so as to force the hot air directly against the cutter blade 20 and into the face of the die 16. Those skilled in the art, of course, will appreciate that while in the depicted embodiment two blower units are used with five hot air tools and five distribution nozzles, such is for the sake of clarity only and, depending on the particular application of the invention, various numbers or types of blower units, hot air tools, or distribution nozzles may be used.

Figure 3:
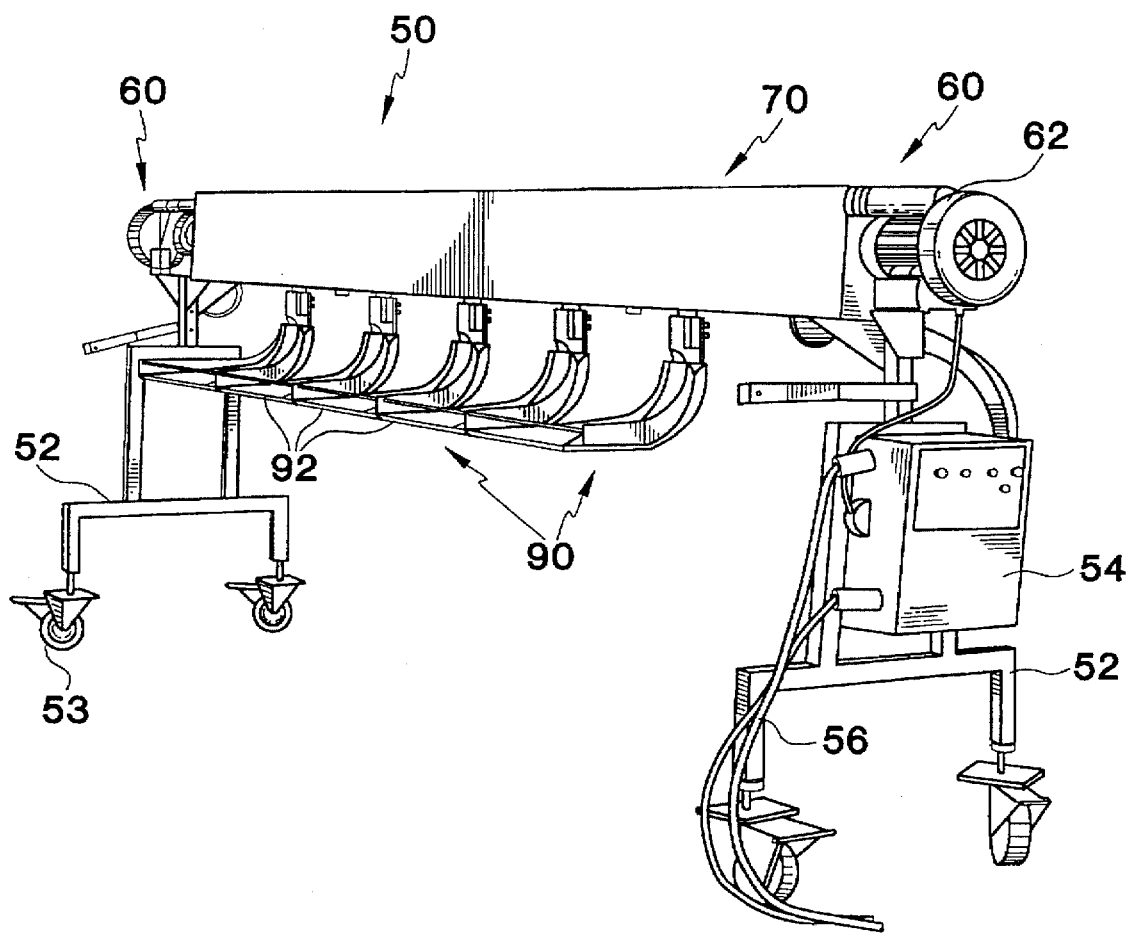
FIG. 3 is a front perspective view of the apparatus for preventing accumulation of material on a cutter mechanism which is shown schematically in FIGS. 1 and 2.

FIG. 3 shows the apparatus 50 mounted on a frame 52 which is movable by means of wheels 53. This embodiment of the invention permits the apparatus 50 to be removably positioned adjacent an extruder to prevent accumulation of material on the cutter used with the extruder. For example, it is possible to utilize an apparatus 50 mounted on a movable frame for selective use with any of various extruders, for example, an extruder producing fat-free pretzels. Optionally, it is possible to permanently mount the apparatus 50 on an extruder apparatus. The invention permits pre-existing extruders to be retrofitted with apparatus for preventing material build up on the cutter blade of the extruder. Further, such retrofitting could be carried out utilizing an apparatus mounted on a movable stand or other support or by securing an apparatus directly to the extruder.

Referring again to FIG. 3, the apparatus 50 includes the air distribution manifold housing 70 which may comprise a sheet metal housing in which is located the air distribution manifold tube 72 (as seen in FIG. 4). One or more blower units 60 is located on the manifold housing 70 with the inlet 62 thereof open to the surrounding air. Suitable electronic controls 54 including wiring 56 are provided to control operation of the blower unit 60 as well as the hot air tools 80 (FIG. 4). The frame 52 includes a bracket or like structure 58 which supports the manifold housing 70 and blower unit 60. As best seen in FIG. 4, the blower unit 60 draws air into inlet 62 and feeds pressurized air via outlet 64 into air distribution manifold tube 72. The air distribution manifold tube 72 includes a plurality of branched fittings, for example T-fittings 74, which distribute the pressurized air into the inlet of heaters or hot air tools 80. Alternatively, the blower units may be replaced by, or utilized with, a compressed air system such as pipes or ducts which convey compressed air to the hot air tools, for example, compressed air which is used to power pneumatic equipment.

Hot air tools 80 heat the pressurized air and exhaust the air into a channel or pipe member 84, as seen in FIG. 3. In a preferred embodiment the channel 84 is rectangular in cross-section. The channel 84 terminates at a fan-shaped nozzle 90 which includes an elongated narrow slot or outlet 92. The configuration or type of nozzles 90 may be selected based on the particular application of the invention. We have found that in extruding pretzel dough, and particularly fat-free pretzel dough, nozzles 90 in the shape of a flattened funnel with an elongated slot or opening 92 adequately direct the hot air at the center.

The plurality of hot air tools 80, channels 84 and nozzles 90 may be formed as an integral structure or as separate pieces attached together. Preferably, the nozzles 90 are secured together by struts 94 which fix the relative position of the nozzle outlets 92 so as to ensure proper operation in conjunction with the extruder. FIG. 5 shows the apparatus 50 from above; and, as seen therein, the air distribution manifold tube 72 is aligned with the inlets of the hot air tools 80, the outlet of each hot air tool 80 including the curved or arcuate channel 84 which positions the nozzles 90 forwardly of the manifold housing 70.

In operation, the material is extruded through the opening in the die plate and the cutter member 20 is reciprocated across the die face and repeatedly cuts the extruded material into portions. The outlet nozzles 90 of apparatus 50 are positioned to force the hot air directly at the cutter blade 20. In a most preferred embodiment, the nozzles 90 direct the air at the top of the face of die plate 16 as seen in FIG. 2. The hot air emitted onto the cutter blade and die face prevents accumulation of the material on the die blade even if the apparatus is operated continuously for long periods of time. We conducted several tests to determine the effectiveness of the present invention in preventing dough from building up on a cutter blade and reducing the incidence of required cleaning procedures. In each case we found that for a given velocity or volume of air flow produced by the air blower unit, setting the temperature of the heater used to heat the air to a temperature within a desired range successfully prevented dough from accumulating on the cutter blade. The test results are described further below.

We tested the invention during extrusion of fat-free pretzel dough from an extruder which included a die face having a pretzel-shaped opening through which the dough was extruded. A knife was reciprocated across and against the die face to sever the extruded dough into individual portions. A hot air blower device fed hot air to a nozzle which was disposed adjacent a die plate attached to the extruder outlet, and the nozzle directed the air against the knife. The nozzle was spaced 3 inches from the die face and disposed at an angle relative to the plane of the die face. The velocity of the air produced by the blower varied within the approximate range of 700 to 1000 feet/minute, and the blower was operated at a temperature which resulted in a temperature at the die plate of approximately 150° F. (±10° F.). The test ran for 3 hours and 8 minutes, and there was no significant build up of dough on either the knife or the extrusion die and stoppage of the machine to clean the knife was not required.

Another test was conducted in which fat-free pretzel dough was extruded through five extrusion barrels, each barrel having a die opening through which the dough was extruded and a knife for cutting the extruded dough into portions. An industrial hot air blower device was positioned adjacent to one of the five extrusion barrels and included a nozzle which emitted the hot air. The blower was operated at a temperature of 500° F. and generated an air velocity at the nozzle exit between 1000 and 1600 feet/minute. The test ran for twenty minutes. The knife and die face of the one extruder had no appreciable dough build up, while a significant amount of dough had accumulated on the knife and die face of each of the remaining four extruders.

As a result of the various tests conducted with respect to pretzel dough, the velocity of the hot air generated by the blower unit preferably is within the range of 500 to 1500 feet/minute, and the operating temperature of the blower unit preferably is selected so as to heat the die plate to approximately 150° F. (±10° F.). The heater may be set to a temperature within a range of from about 437°–527° F. (225°–275° C.). In a most preferred embodiment, the heater temperature is set to approximately 482° F. (250° C.) and the resulting die plate temperature is approximately 150° F. Also, the hot air distribution fan-shaped nozzles preferably are positioned ½ inch from the top of the die plate and 6 inches away from the die face. Of course, depending on the specific application, the temperature and air velocity of the apparatus may be set accordingly, for example by controls provided on each hot air tool 80. Also, the position of the nozzles relative to the extruder dies may be adjusted, for example, by adjusting the height or position of the movable support frame.

The aforesaid problem with prior art extrusion apparatus regarding frequent stoppage of the machine to clean the cutter blade also adversely affects the quality of the product being produced. For example, in the production of pretzels by extruding pretzel dough, when one of the production lines has to be shut down in order to clean dough build up on the cutter blade, the oven temperatures in that line rise above the set point due to the loss of loads, i.e., pretzel dough being placed in the oven. The increased oven temperatures result in a lower moisture level in the finished product, which in turn increases the chance of a burnt product. Alternatively, such rise in the oven temperatures due to line stoppage may cause the oven controller to overcompensate for the temperature rise so as to move the oven temperatures below the set point. This will result in a high moisture level in the finished product, which in turn increases the chance of the product becoming stale. Either way, stoppage of lines to clean the cutter increases the likelihood that product quality will suffer.

However, the apparatus of the present invention prevents build up of the material on the cutter blade and thus frequent machine stoppages are not necessary. Consequently, this serves to maintain the oven temperature constant during the production of pretzels, which results in a higher quality finished product. In addition, the invention permits increased efficiency which results in a greater volume of finished product. That is, as there are no frequent production line stoppages to clean the cutter blade, a significantly greater amount of product is able to be produced as compared with prior art systems. It is apparent that the present invention overcomes the problems with the prior art and permits virtually uninterrupted operation of the production lines thereby minimizing the amount of lost product due to line stoppages.

Other modifications and variations of the invention disclosed herein will be apparent from the foregoing detailed description which is made only for the sake of a complete disclosure and should not be utilized in a limiting sense in interpreting the scope of the present invention.

What is claimed is:

1. A process for producing portions of dough products comprising:

providing: an extruder having an inlet for receiving a supply of dough and an outlet, the outlet including a die face having a die opening therein which imparts a desired configuration to dough extruded therethrough; a cutter mechanism including a cutter blade disposed adjacent the die opening for cutting the extruded dough; and a hot air blower device with an outlet positioned adjacent the cutter blade and die face;

feeding a dough mass into the inlet of the extruder;

forcing the dough mass through the die opening to form an extruded length of dough having a desired configuration;

operating the cutter mechanism to cut the extruded length of dough into a plurality of dough portions; and directing hot air from the outlet of the blower device against the cutter blade while extruding and cutting the extruded length of dough to prevent dough from accumulating on the cutter blade.

2. A process according to claim 1, wherein the cutter blade contacts the die face and cuts the extruded length of dough from the die opening, and hot air is forced against the cutter blade and the die face.

3. A process according to claim 1, wherein the hot air blower device includes at least one heater element and at least one air inlet, and air is drawn through the inlet and forced over the heater element and through an outlet nozzle against the cutter blade.

4. A process according to claim 3, wherein the outlet nozzle has an elongated thin air opening which directs the hot air against the cutter blade.

5. A process according to claim 1, wherein the hot air blower device is mounted on a support and is movable with respect to the extruder.

6. A process according to claim 1, wherein a continuous cutter blade is provided adjacent a plurality of die openings to cut the extruded length of dough exiting said die openings.

7. A process according to claim 1, wherein the hot air blower device includes an inlet for receiving ambient air which is heated and directed against the cutter blade.

8. A process according to claim 1, wherein the dough is pretzel dough and the extruded length of dough is cut into pretzels.

9. A process according to claim 1, wherein the hot air is directed at an angle relative to the plane of the die face.

10. A process according to claim 1, wherein the hot air blower is set at a temperature which heats the die plate to a temperature within a range of from about 140° to about 160° F.

11. A process according to claim 10, wherein the die plate is heated to a temperature of about 150° F.

12. A process according to claim 10, wherein the blower device produces hot air at a velocity within a range of from about 500 to about 1500 feet/second.

13. A process according to claim 12, wherein the velocity is about 1000 feet/second.

* * * * *